United States Patent

Leichtfried et al.

Patent Number: 6,090,227
Date of Patent: Jul. 18, 2000

[54] STRUCTURAL UNITS FOR GLASS MELTS MADE FROM A MOLYBDENUM/TUNGSTEN ALLOY

[75] Inventors: Gerhard Leichtfried, Reutte; Hans-Peter Martinz, Höfen, both of Austria; Joachim Disam, Mainz, Germany

[73] Assignee: Schwarzkopf Technologies Corp., Franklin, Mass.

[21] Appl. No.: 09/074,293

[22] Filed: May 7, 1998

[30] Foreign Application Priority Data

May 9, 1997 [AT] Austria .................................. 285/97 U

[51] Int. Cl.⁷ .................................................. C22C 27/04
[52] U.S. Cl. ......................... 148/423; 420/429; 420/430; 75/232; 75/245; 75/248
[58] Field of Search ............................ 148/423; 420/429, 420/430; 75/232, 245, 248

[56] References Cited

U.S. PATENT DOCUMENTS

| 3,661,536 | 5/1972 | Shimizu et al. | |
| 3,791,799 | 2/1974 | Heitzinger. | |
| 4,587,174 | 5/1986 | Yoshimura et al. | 428/552 |
| 4,622,068 | 11/1986 | Rowe et al. | 75/245 |
| 4,668,262 | 5/1987 | Kithany | 428/644 |
| 4,755,712 | 7/1988 | Mujahid et al. | 420/429 |
| 4,812,372 | 3/1989 | Kithany | 428/664 |
| 4,950,327 | 8/1990 | Eck et al. | 75/232 |
| 5,028,756 | 7/1991 | Ezaki et al. | 420/429 |
| 5,051,139 | 9/1991 | Eck | 148/422 |
| 5,590,392 | 12/1996 | Ishiwata et al. | 428/546 |
| 5,604,321 | 2/1997 | Patrician et al. | 75/248 |

FOREIGN PATENT DOCUMENTS

| 386 843 | 10/1988 | Austria. |
| 1 308 752 | 3/1973 | United Kingdom. |
| WO 85/03953 | 9/1985 | WIPO. |
| WO 93/21357 | 10/1993 | WIPO. |
| WO 96/22402 | 7/1996 | WIPO. |

Primary Examiner—John Sheehan
Attorney, Agent, or Firm—Morgan & Finnegan, L.L.P.

[57] ABSTRACT

Structural units which come into contact with glass melts and ceramic melts are exposed to strong corrosive attack. Molybdenum is a known material for glass melt electrodes but it is not usable for the majority of highly corrosive glass and ceramic melts. The use of a special molybdenum and/or tungsten alloy as the material for the structural unit reduces corrosion even in the case of contact with highly corrosive glass and ceramic melts.

2 Claims, No Drawings

STRUCTURAL UNITS FOR GLASS MELTS MADE FROM A MOLYBDENUM/TUNGSTEN ALLOY

FIELD OF THE INVENTION

The invention relates to structural units which come into contact with glass melts and/or ceramic melts which are made from alloys comprising molybdenum and/or tungsten.

BACKGROUND OF THE INVENTION

High mechanical strength or good creep characteristics at high usage temperatures are expected primarily from refractory metals as high temperature materials. In the past, there has been no lack of proposals to improve these properties via the formation of a alloys.

For example, an alloy is described in AT 386 612 (which corresponds to U.S. Pat. No. 4,950,327) which comprises high melting metals like molybdenum and tungsten with the formation of a specific structure which contains 0.005–10 wt % of one or more high melting compounds comprising oxides and/or silicates, among others. Molybdenum/tungsten alloys with small proportions of oxide, preferably below 2%, find use in practice.

Structural units which come into contact with glass melts and/or ceramic melts such as melt electrodes, linings, stirring devices, piping, returns and the like have to fulfill a number of stringent requirements simultaneously. In particular, they have to possess high chemical resistance relative to the melt, high resistance to oxidation, adequate mechanical strength at usage temperatures between approximately 1100° C. and 1600° C. as well as high mechanical resistance to changing temperatures. The requirement of good electrical conductivity also applies in the case of glass melt electrodes which are an example of such structural units.

In addition, the structural units should be readily processable by mechanical means and they should contaminate the melt as little as is possible.

In the past, the high melting metals molybdenum and tungsten and certain alloys of these metals, their silicides and also materials such as graphite, platinum or ceramic materials such as tin oxide have been used as a material for the manufacture of melt electrodes which constituted the largest proportion of such structural units from a quantity standpoint. In addition, attempts have also been made to improve their corrosion and oxidation characteristics further by means of special coatings of the electrode material.

Despite certain disadvantages, the high melting materials pure molybdenum, Mo30W or molybdenum with 0.5 vol % $ZrO_2$ (known by the abbreviation PSZ, Z6) are used in practice as a material for structural units which come into contact with glass melts or ceramic melts using standard compositions (no special glass). However, the corrosion characteristics of these materials are unsatisfactory for strongly corrosive types of glass or ceramic melts. Strongly corrosive glass or ceramic melts are particularly those with appreciable proportions of polyvalent ions, e.g., As, Sb, Zn, Ni, Mn, Co, Pb and sulfate. The working life of the material is determined in this regard both by the uniform surface oxidative removal of molybdenum and by locally selective corrosive attack.

Until now, no economically and technically satisfactory procedures have become known which prevent the chemical contamination of highly corrosive glass melts, i.e., melts with additions which form polyvalent ions, via the products of the corrosion of the materials of the structural unit, i.e., molybdenum/tungsten. An aggravating aspect in addition is that the ongoing corrosion mechanisms, in the melt are not known in detail.

AT 386 843 describes the use of a heat resistant molybdenum alloy, which essentially comprises 0.05–19.9 wt % silicon with the remainder being molybdenum, for molded units, etc., which come into contact with ceramic melts. Such molded units have good oxidation and corrosion resistance in addition to excellent creep resistance at high usage temperatures. A disadvantage as a consequence of the high silicon content is that the designated alloy is practically incapable of being shaped mechanically so that the majority of structural units for glass melt devices cannot be economically manufactured.

U.S. Pat. No. 4,668,262 describes a structural unit, especially a glass melt electrode, of a high melting metal, preferably molybdenum or tungsten, which has been provided with an external protective layer of chromium oxide and an intermediate coat of molybdenum silicide in order to improve its oxidation resistance at high usage temperatures. Such glass melt electrodes have superb resistance to oxidation at high temperatures. However, a disadvantage is that the protective coat is degraded in the course of time and it therefore results in only very temporary protection against the oxidizing components of the melt. In addition, the dyeing of the glass melt by Cr oxide is incompatible in most cases. The long-term corrosion properties are not therefore improved by such protective coats.

Thus the problem which the present invention seeks to solve comprises the provision of an alloy for use in structural units which come into contact with glass and/or ceramic melts and which have improved corrosion resistance compared to known materials, especially with respect to highly corrosive glass and ceramic melts with additions of metal compounds forming polyvalent ions. In this connection, the improvement must not impair in any substantial manner either the economics of the previously used glass melt process or the other properties which are required of such materials for structural units.

BRIEF DESCRIPTION OF THE INVENTION

The problem is solved for structural units which come into contact with glass or ceramic melts by the use of molybdenum alloys and/or tungsten alloys according to the present invention.

It was not possible to foresee the improvements in corrosion resistance achieved in the case of usage in accordance with the invention, while maintaining the other properties required for such usage. In fact, the stability of molybdenum and tungsten, different from, for example, the platinum materials is thermodynamically inexplicable, i.e. the known redox potentials in the glass-melt/structural unit material system, make the materials molybdenum/tungsten appear unsuitable from this point of view for use in glass melts. The compatibility of molybdenum with glass melts must therefore be explained via the kinetics of various simultaneously occurring reactions. However, up to now the kinetic processes were so little known that they did not permit even semiquantitative predictions about the usability/nonusability of individual materials on the basis of molybdenum/tungsten in different glass/ceramic melt compositions and especially with significant proportions of polyvalent elements.

DETAILED DESCRIPTION OF THE INVENTION

The improved usability of the materials in accordance with the present invention in contact with glass/ceramic melts pertains to the totality of the following features or properties:

improved corrosion characteristics, which means, in detail, less removal of material from the surface lower intercrystalline corrosion (reduction in the danger of breakage)

less contamination of the glass melt less formation of liquid metal lakes (compounds of Mo/W and melt components) on the bottom of the bath (danger of short circuiting in the case of electrically heated melts)

largely unchanged, also unreduced electrical conductivity in comparison with pure metals Mo, W (important in glass melt electrodes)

maintenance of good mechanical processability during the shaping of the structural units in comparison with pure Mo/W no problems impairing the quality of the glass melt, like bubble formation via volatile corrosion products or gas evolution from structural unit materials no necessity for initiating safety measures due to classification of the health-endangering corrosion products.

Corrosion investigations in different glass and ceramic melts, e.g., borosilicate glass with different Sb contents, have shown that, as already mentioned above, two different corrosion mechanisms act on the corresponding structural units, namely uniform surface removal, primarily caused by superficial oxidation of the molybdenum/tungsten, and a corrosive attack known as intercrystalline corrosion, along the grain boundaries of these materials. However, the mechanisms of grain boundary corrosion in Mo/W metals were not known until now. No attention has been given to the problem and, accordingly, no specific steps have been taken for their solution.

Intercrystalline or grain boundary corrosion is caused by glass components in the melt which are reduced by molybdenum/tungsten and which subsequently form relatively low-melting compounds with molybdenum/tungsten which spread out along the grain boundaries by diffusion and thus weaken the structure.

Corrosion investigations on materials in accordance with the invention which were carried out both current-free and also under electrical load led to the surprising result that, compared to materials in accordance with the prior art, surface material removal is distinctly reduced by the addition of oxides/silicates to molybdenum/tungsten within the limits in accordance with the invention. Small contents below 1.6 volt are largely without any effect. Since the oxides/silicates form a nearly continuous plain structure network in the material at higher contents above 10 vol %, a melt process occurs at these contents which is disadvantageous for the corrosion protection effect, i.e. the additions are dissolved out by the glass melt and replaced by these.

The removal rate is distinctly reduced in the range from about 3–10 vol % oxide/silicate with a minimum at about 6 vol % oxide/silicate.

The reason for this is not yet known in detail. It can reside both in improved kinetic inhibition of a transfer reaction and in intensified inhibition of the inward and outward transport of the oxidizing or alloy-forming components, respectively.

In detail, the oxide/silicate which more or less effectively suppresses corrosion depends on the composition of the glass melt. The oxides or silicates of metals from the group Zr, Hf and Y show very good results in all the glass melts investigated; good results are also shown in some melts, e.g., the use of rare earth oxides in pure $SiO_2$ melts.

For improved total corrosion characteristics in the material, it has now been decisively proven that one should take selectively targeted corrosion-inhibiting steps in regard to each of the two individual corrosion mechanisms: surface removal of material and grain boundary attack.

The quantity and nature of the alloy additions to the Mo/W material are also optimized in the composition of the ceramic/glass melt.

In less corrosive glass and ceramic melts, corrosion of the structural unit can already be adequately improved by oxide/silicate additions to the Mo/W material in accordance with the invention.

In melts with polyvalent elements which cause strong grain boundary corrosion, like Pb, As, Sb, Co, Ni and Mn, satisfactory corrosion protection is achieved by supplementary additions of Si and/or B.

In addition to the strongly reduced surface removal, measurably more favorable grain boundary corrosion characteristics result from the addition in accordance with the invention of oxides to the molybdenum/tungsten material, but grain boundary attack is above all significantly reduced by the supplementary addition of 0.0050–0.05 wt % Si or B. The latter elements preferentially accumulate at the grain boundaries of the Mo/W material.

Extensive experimental series document that the optimum Si, B additions lies at approximately 0.03 wt % in glass melts investigated. The corrosion rate again increases at higher contents, which can be connected with an increase in the diffusion rate. With higher addition rates of B and/or Si, however, the mechanical processability of the material is also reduced, i.e. the processing costs for shaping the structural unit increase. It is therefore essential to limit the additions of B and/or Si to those necessary for corrosion reasons.

The metals Pd, Pt, Ir and Ru in quantities of 0.05–3 wt % act in the same way as Si and B. However, for economic or cost reasons, the use of these additions is reserved for a limited usage area.

In the embodiment examples below, the corrosion characteristics of the pure metals Mo and/or W, which are conventionally used in the prior art, are contrasted with the alloys in accordance with the invention.

It will be understood by those skilled in the art that various modifications and substitutions may be made to the invention as described above without departing from the spirit and scope of the invention. Accordingly, it is understood that the present invention has been described by way of illustration and not limitation.

EXAMPLE 1

In this and the following examples, a description is given of the preparation of various molybdenum/tungsten alloys and the corrosion tests that were carried out with them.

The preparation of the individual materials takes place in the same way in all the examples, namely in accordance with the following manufacturing steps:

provision of the metal powders mixing with the additives if provided compression of the "green" compact sintering heat treatment of the sintered products 4–5 shaping steps, optionally with intermediate heat treatments mechanical processing of the semifinished product to give a cylindrical electrode.

The corrosion investigations on the structural units that are produced in this way, i.e., glass melt electrodes in this case, took place in a laboratory apparatus with a 12 cm depth of immersion of the electrode into a glass melt. The length of the electrodes uniformly amounted to 20 cm and their diameter amounted to 1 cm. The melting crucible consisted of quarzal that had been let into platinum. The basic heating of the melt took place via a 10 kHz induction heating system. The electrodes were effectively protected from contact with atmospheric oxygen by covering them with a ceramic sheathing and flushing them with argon as a protective gas. A current density of 1.5 A/cm$^2$ was applied at the electrodes with a heating frequency of 50 Hz.

A temperature gradient was present in the melt because of increased heat irradiation from the surface of the melt. The temperature at the tip of the electrode uniformly amounted to 1640° C. The time of the experiment amounted to 200 h, the glass was then cooled down to room temperature within a period of approximately one day. The corrosive surface removal of material from the electrode was ascertained by means of optical microscopic measurements on the electrode cross-section for various electrode immersion depths.

The surface removal of material, i.e. the reduction in the diameter of the electrode, is indicated in units of mm/year.

In addition, the maximum depth of corrosion/attack, i.e. the maximum depth from the surface, was determined by means of electron microscopy investigations in which intercrystalline corrosion reactions were detectable along the grain boundaries.

Intercrystalline corrosion (material penetration which is measured in mm/year), which starts out from the surface, cannot be made visible by electron microscopy in those cases in which its value is smaller than the surface removal of material, which is also measured in mm/year. Accordingly, its effect on total corrosion is minor.

Intercrystalline corrosion, which is actually higher relative to surface removal and is thus detectable by electron microscopic, is important for the evaluation of overall corrosion characteristics since its indicates outbreaks of individual crystallites from the material which are not detected via surface removal, whereby this additionally reduces the mechanical strength of the structural unit. Thus, for example, the danger of breakage of the structural unit in these cases would be expected to be higher than on the basis of a reduction in their wall thicknesses or diameters.

According to the aforementioned manufacturing and investigation procedure, pure molybdenum metal powder with a grain size of 4.1 μm in accordance with the Fischer technique was compacted by means of isostatic compression, sintered over a period of 5 h at 2050° C. to give a density of 9.70 g/cm$^3$ and shaped by forging and hammering at temperatures between 1400° C. and 900° C.; it was then heat treated at 1600° C. over a period of 1 h and then shaped to give rods by means of mechanical processing.

The use of pure molybdenum as a material for structural units which come into contact with glass and ceramic melts forms part of the prior art.

The glass melt used for the corrosion tests consisted of 79% $SiO_2$, 10% $B_2O_3$, 3% $Al_2O_3$, 4.5% $Na_2O$, 0.5% CaO, 1% MgO, and 2% $Sb_2O_3$. The corrosion investigations in accordance with the process which is described above led to a computed rate of surface removal of 17 mm/year and an average depth of corrosion of 20 mm (based on the initial diameter).

EXAMPLE 2

Three materials in accordance with the invention were manufactured and investigated in parallel in a further series of experiments using the manufacturing procedure of Example 1. In addition to the molybdenum, the powder preparations contained $ZrO_2$ powers with a grain size of 0.7 μm, in quantities of 3, 5 and 7 vol %.

The associated rates of surface removal amounted to 11 mm/year, 8 mm/year and 8.5 mm/year; the average depths of corrosion amounted to 19 mm, 16 mm, and 16.5 mm per year (based on the initial diameter).

EXAMPLE 3

A material in accordance with the invention was prepared using the manufacturing process of Example 1 and had the following composition:

5 vol % $ZrO_2$ (powder grain size 0.7 μm) and 0.03 wt % Si (Si powder grain size 2.6 μm), whereby the remainder was molybdenum.

A pair of electrodes comprising this material was exposed to the highly corrosive glass melt in accordance with Example 1.

The corrosion rate, determined as surface removal, amounted to 5.5 mm/year and the average depth of corrosion amounted to 6 mm/year (based on the initial diameter).

EXAMPLE 4

A material of the following composition in accordance with the invention was produced using the process in accordance with Example 1:

5 vol % $ZrO_2$ and 0.03 wt % B (boron powder with a grain size 0.8 μm), whereby the remainder was molybdenum.

The glass melt which was used for the corrosion test and the corrosion evaluation procedures also correspond to those of Example 1.

The corrosion rate, determined as surface removal, amounted to 7 mm/year; the average corrosion depth as a consequence of intercrystalline corrosion amounted to 11.5 mm/year (based on the initial diameter of the electrode).

EXAMPLE 5

The material produced in accordance with Example 1 had the following composition: 2 vol % $ZrO_2$ and 0.03 wt % Si (grain size 2.6 μm), whereby the remainder was molybdenum.

The corrosion test carried out in accordance with Example 1 resulted in surface removal at the rate of 12.5 μm/year and no visible intercrystalline corrosion. Intercrystalline corrosion therefore lies below that which arises from surface removal (12.5 μm/year). This result corresponds to a value of 11.5 mm/year for the average depth of corrosion measured in Example 4 and produced by intercrystalline corrosion.

A comparison of the results from Examples 4 and 5 supports the statement made in the specification that account has to be taken of a lower limit for the quantity of oxides or silicates added.

What is claimed:

1. A structural unit that comes into contact with corrosive glass/ceramic melts, wherein said melts contain corrosive metal oxides, said structural unit being formed from a material comprising the metals molybdenum and/or tungsten and, 0.0050–0.04 weight % of Si and/or B with 1.6–10 vol % in the metal of finely divided quantities of one or more oxides and/or silicates of the elements Zr, Hf, Al, Ca, Mg, Y, La, Ce, Pr, Nd, Gd, Er, whereby the simultaneous addition of Si and silicates is excluded.

2. The structural unit according to claim 1, wherein the material comprises of 4.0–8.0 vol % of one or more oxides or silicates of the metals Zr, Y, Al or Hf and 0.01–0.04 wt % B, whereby the remainder consists of molybdenum and/or tungsten.

* * * * *